Jan. 30, 1951   C. E. COOPER   2,539,893
COMBINATION FOOD CONTAINER AND SERVING TRAY
Filed June 1, 1948

INVENTOR.
Cecil E. Cooper
BY
ATTORNEY.

UNITED STATES PATENT OFFICE 2,539,893

COMBINATION FOOD CONTAINER AND SERVING TRAY

Cecil E. Cooper, Leavenworth, Kans.

Application June 1, 1948, Serial No. 30,342

1 Claim. (Cl. 312—107)

This invention relates to an item of household equipment, furniture and the like and more particulary to a combination food container and serving tray mounted upon a mobile structure and capable for use not only as a cabinet for kitchens and the like but adapted to be moved to a position where food contained and carried thereby may be easily and quickly served.

The most important object of this invention is the provision of a serving tray having a plurality of separable and substantially identical cabinets mounted in side-by-side rows with the cabinets thereof relatively superimposed and the uppermost of such cabinets presenting a flat surface usable as a serving tray.

Another important object of this invention is to provide an article of furniture of the above-mentioned character, wherein the cabinets are mounted upon a mobile base, so formed as to permit moving of the entire assembly into position serving as a kitchen cabinet when not in use as a serving tray.

A further object is to provide guard rails on the above-mentioned uppermost flat surface of the device that are removable when the assembly is being used as a unitary cabinet.

A further object of this invention is to provide a combination food container and serving tray having separable and complementary food-containing cabinets provided with a refrigerating chamber and a chamber for keeping food to be served at a desired temperature, the heating means for said last-mentioned chamber serving, also, to maintain the food on the tray itself in a heated condition.

Other more minor objects will be made clear or become apparent during the course of the following specification, reference being had to the accompanying drawing, wherein.

There is a present need in many homes today for a simple and easy means for serving food inasmuch as it is difficult to obtain cooks, maids and other servents. Food is usually prepared for guests long prior to their arrival and time of serving and carrying of the food from its point of preparation to the guests, together with returning soiled dishes and remaining food, is a time-consuming and difficult task.

It is the primary aim of this invention, therefore, to provide a device capable of receiving the food as the same is prepared, maintaining the same in a heated or a cooled condition and, also, adaptable of moving all of such food to a point of serving. After the meal or lunch is completed, the device forming the subject matter of this invention can be returned to the kitchen and subsequently emptied of its contents and moved to its original position, serving as a part of the kitchen cabinet assembly itself.

Figure 1:
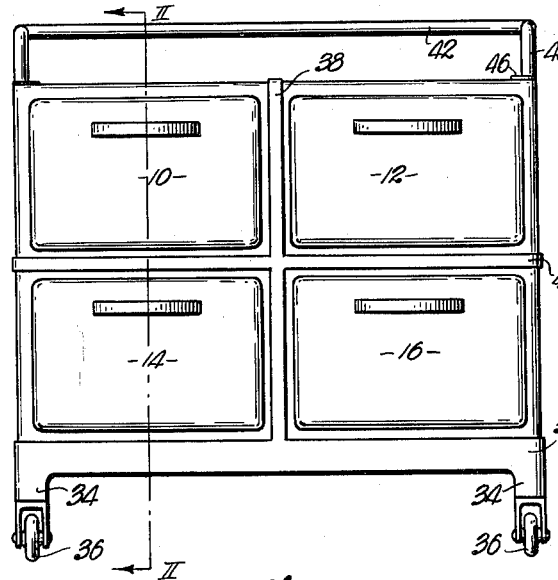
Fig. 1 is a front elevational view of a combination food container and serving tray made in accordance with the present invention.
Figure 2:
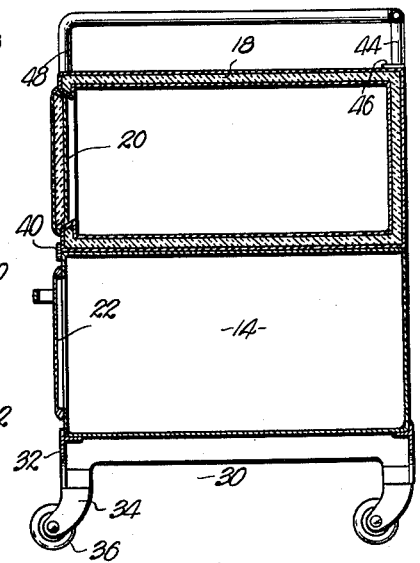
Fig. 2 is a vertical cross sectional view taken on line II—II of Fig. 1, looking in the direction of the arrows.
Figure 3:
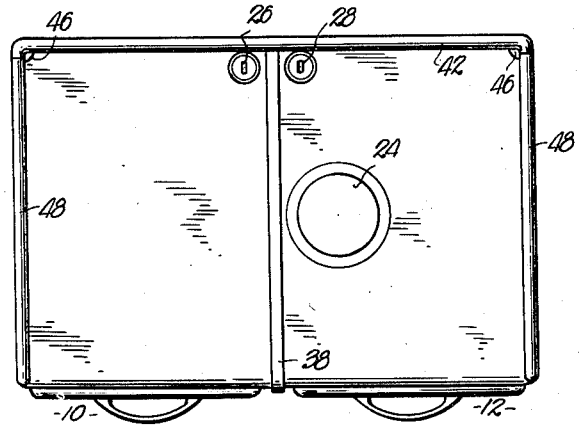
Fig. 3 is a top plan view thereof.
Figure 4:
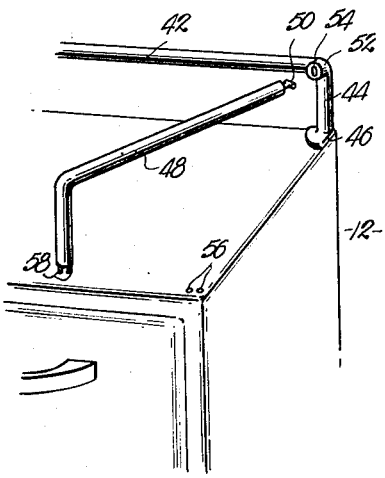
Fig. 4 is a fragmentary perspective view showing one of the guard rails entirely removed; and, Fig. 5 is a fragmentary detailed view partially in section showing the connection of one end of the removable guard rails.
Figure 5:
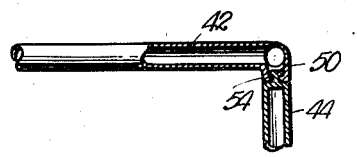

In the drawing, a plurality of separable and substantially identical cabinets are broadly designated by the numerals 10, 12, 14 and 16, respectively. These four cabinets are preferably polygonal in cross section and provided with flat top and bottom walls, to the end that the same may be placed in relatively stacked superimposed relationship as indicated in Figs. 1 and 2. By making these four cabinets all of the same size and contour, they may be changed to suit the desire of the purchaser and may be purchased in any combination desired.

As shown in Fig. 2, the cabinet 10 is of double wall construction and provided with insulation 18 between all of such walls. A door 20 for this cabinet 10 is likewise insulated and hingedly mounted in any suitable manner.

It is contemplated that this compartment 10 constitute a refrigerating unit having the usual cooling unit therein, and the hollow compartment 14 immediately therebelow accommodate the generator, motor and other structure for operating the refrigerator. Such refrigerating unit may be of any of the well-known types and forms no part of this invention and, therefore, has not been shown in the drawing.

In the event that it is desired to cool the compartment 10 by ice or other means not necessitating the use of the compartment 14, then this last-mentioned compartment may be used for storing dishes, plates, pots and pans, etc., if desired. This compartment 14 is, likewise, provided with a door 22 hingedly mounted for rendering the interior of compartment 14 accessible.

Compartments 12 and 16 are, likewise, hollow, the former being provided with a heating element 24 that rests directly upon the uppermost face of this compartment 12. This heating element 24 may constitute an electric plate or any other heating means and electric outlet plugs 26 and 28, in the top walls of compartments 10 and 12 respectively, serve to interconnect the refrigerating apparatus above mentioned and the electric plate 24.

Thus, as the device is moved from one position to another, the electrical connection by means of an extension cord can be disconnected as desired.

It is contemplated that the electric plate 24 serve not only to heat the interior of compartment 12 but, also, to keep food placed thereon in a warm condition. Consequently, at least that part of the upper wall of compartment 12 underlying plate 24 should be of heat conducting material, to the end that the interior of compartment 12 is automatically kept warm when the element 24 is energized.

Compartment 16 which underlies the compartment 12 may be provided with shelving, racks and the like for receiving dishes, cooking utensils, table ware, napkins and the like. As shown in Fig. 1, both of these compartments 12 and 16 are likewise provided with doors at the front thereof to render the interior of such compartments accessible.

All of the compartments 10, 12, 14 and 16 are supported by a polygonal base broadly designated by the numeral 30. This base 30 has a continuous polygonal frame 32 at the uppermost edge thereof that is L-shaped in cross section as indicated in Fig. 2 for receiving the bottom walls of compartments 14 and 16 and overlapping the lowermost marginal edges thereof.

Base 30 is, also, provided with caster assemblies 34 having wheels 36 rotatable on a horizontal axis. These casters 34 are, also, revolvable on a vertical axis.

Any suitable means for joining the cabinets 14 and 16 as by screws passing through the frame 32 of base 30 and the bottom walls of cabinets 14 and 16 may be provided for holding the latter in place. Likewise, if desired, the cabinets 10 and 12 may be releasably secured to the underlying cabinets 14 and 16, respectively, through the use of interconnecting bolts, screws or the like. As shown particularly in Figs. 1 and 2, the joint between cabinets 10 and 12 and between cabinets 14 and 16 is covered by a relatively narrow elongated vertical batten 38, whereas, the joint between cabinets 10 and 14 and 12 and 16 is covered, not only along the front of the assembly, but along the two sides thereof, with a horizontal strip 40. These strips 38 and 40 should be interconnected to the end that a smooth surface is presented at the point of intersection between these strips at the front of the assembly. Conventional means for securing these strips 38 and 40 in place is contemplated.

The uppermost surface of the two cabinets 10 and 12 is flat and horizontal to present a serving tray. The dishes and other utensils to be placed upon this uppermost flat surface are protected by a guard rail constituting a back rod 42 having down-turned legs 44. In other words, this rail 42 extending longitudinally along the back of the assembly is U-shaped and the free ends of its legs 44 are secured as at 46 in any suitable manner directly to the uppermost faces of cabinets 10 and 12 respectively.

A pair of side rails 48 are L-shaped, the longer leg thereof being provided with a T-shaped member 50 on the free end thereof. The rail 42 has a forwardly projecting portion 52 slotted as at 54 for receiving the T-shaped member 50.

At the forward corner of each of the compartments 10 and 12 is provided a pair of relatively small openings 56 for receiving a pair of down-turned prongs 58 on the free end of the short leg of side rail 48.

It is thus clear that the L-shaped rail 48 can be turned to a point where the member 50 is insertable into the slot 54 and the rail 48 again turned 90° to dispose prongs 58 directly above openings 56 for receipt thereby.

It is clear from the foregoing that the entire assembly by virtue of the revolvable casters 34 can be moved about to and from a position forming a part of a kitchen cabinet assembly. When so desired, and with the side rails 48 removed, the compartments of the assembly might be used in the conventional manner and the serving tray portion thereof, i. e., the uppermost flat surface, utilized as a working table as is common in kitchen cabinets.

Those preparing food to be later served can place the same in the two compartments 10 and 12 for cooling and maintaining in a warm condition respectively until such time as guests are to be served. When such serving is to take place, the side rails 48 are moved into operative position, table ware placed upon the uppermost surface of the assembly and the entire apparatus moved as a body from the kitchen to the dining room or other point of serving.

The host or hostess may then serve directly from the compartments 10 and 12 and have dishes, table ware and the like readily accessible by virtue of the storage compartment 14. Any food taken from the hollow compartment 12 and placed upon the heating element 24 will stay in a warm condition while serving takes place.

When a dining table is to be cleared away, remaining food, soiled dishes and table ware can all be replaced into the various compartments, the entire assembly moved from the dining room and into the kitchen quickly and easily.

Manifestly, much time can be conserved through use of the combination food container and tray and the hostess need not consume time by preparing the food after the guests have arrived.

While only one embodiment of the present invention has been illustrated and described, it is manifest that such changes and modifications as fairly come within the scope of the appended claim is contemplated hereby.

Having thus described my invention, what I claim as new and desire to secure by Letters Patent is:

In an article of furniture, a polygonal, mobile base including a continuous closed frame having a number of interconnected, upstanding sides and a horizontal flange on the innermost face, and spaced below the upper edges of each of said sides respectively; a plurality of separable containers arranged in side-by-side stacked columns with the lowermost containers resting upon said flanges and confined within said side walls; and a band covering each joint respectively between the containers in partial overlapping relationship to the latter, said bands being integrally interconnected and attached to said base.

CECIL E. COOPER.

REFERENCES CITED

The following references are of record in the file of this patent:

UNITED STATES PATENTS

| Number | Name | Date |
|---|---|---|
| 1,455,395 | Exum | May 15, 1923 |
| 1,803,330 | Johnson | May 5, 1931 |
| 1,985,412 | Jackson | Dec. 25, 1934 |
| 2,196,035 | Shaw | Apr. 2, 1940 |